(No Model.)
T. J. GOLDSCHMID.
TRAP FOR AMMONIA REFRIGERATING APPARATUS.
No. 346,038. Patented July 20, 1886.
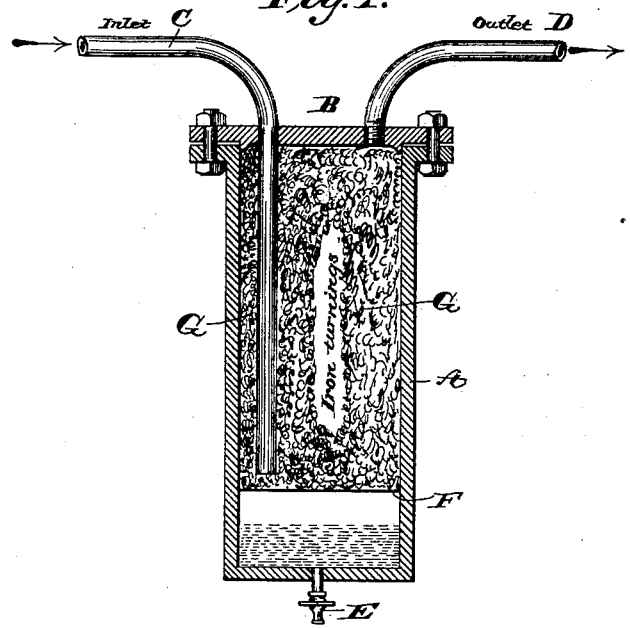
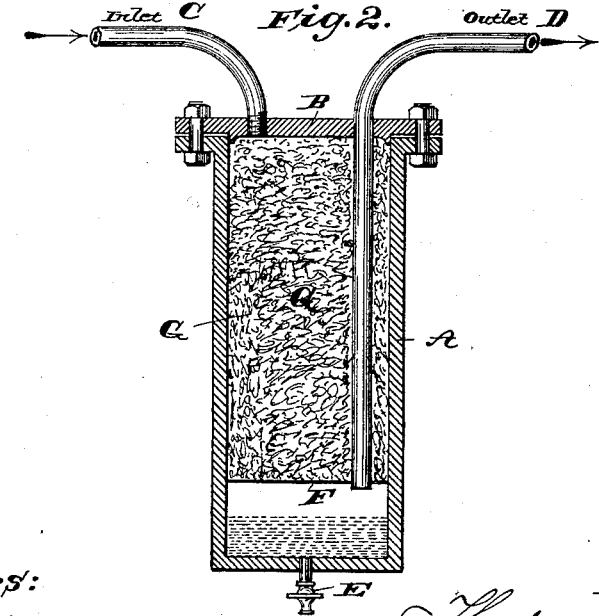
Witnesses:
Inventor:
Theodore J. Goldschmid
by his attorney

UNITED STATES PATENT OFFICE.

THEODORE J. GOLDSCHMID, OF PHILADELPHIA, PENNSYLVANIA.

TRAP FOR AMMONIA REFRIGERATING APPARATUS.

SPECIFICATION forming part of Letters Patent No. 346,038, dated July 20, 1886.

Application filed June 8, 1886. Serial No. 204,520. (No model.)

*To all whom it may concern:*

Be it known that I, THEODORE J. GOLDSCHMID, a citizen of the United States, residing at Philadelphia, in the county of Philadelphia and State of Pennsylvania, have invented certain new and useful Improvements in Traps for Ammonia Refrigerating Apparatus; and I do hereby declare the following to be a full, clear, and exact description of the invention, such as will enable others skilled in the art to which it appertains to make and use the same.

My invention is an improved trap for ammonia refrigerating apparatus. In operating this class of devices oil is frequently carried from the compressor into the condenser, and finally into the expansion-pipes, where it is congealed and clogs and stops such pipes, causing great delay and annoyance. I overcome this difficulty by my improved trap, which I place in the connection between the compressor and condenser, or between the condenser and the expansion-pipes, and its construction is such that the oil is retained in the trap and is not carried into the condenser and pipes.

Figure 1 is a section of one form of my improved trap. Fig. 2 is a section of my trap with a different relative arrangement of the inlet and outlet pipes.

In the drawings, A is the receptacle forming the main body of the trap. B is the cover. C is the inlet, and D is the outlet pipe therefor.

F is a foraminous plate placed a short distance above the bottom of the trap, with a filling, G, of metallic trimmings, coarsely broken coke or glass, mineral wool, or finely-coiled iron or steel wire closely coiled above the same; or a series of perforated diaphragms placed one above the other at short distances apart may also be employed. The arrangement of the inlet and outlet is such that the ammonia in its passage through the trap is forced to pass through the whole or greater part of the filling in the trap.

In Fig. 1 the inlet-pipe extends down almost to the bottom of the filling, and the outlet-pipe has a connection with the trap at the top. In Fig. 2 the relative arrangement of the two is reversed; but the result is substantially the same in both cases.

The pipes are connected to the top or cover of the trap, for the convenience in removing the body of the same for the purpose of cleaning it or for removing the fillings. The same result would be attained were the pipes connected to the trap in the same relative arrangement through the main body thereof or the receptacle A. The foraminous plate may be dispensed with and the whole of the chamber of the trap filled with the material specified. In such case the inlet and outlet pipes will have the same relative arrangement.

In the passage of the ammonia through the device the oil is caught or detained by the filling material, and drips down to the bottom of the trap, where it is drawn off from time to time through the drain-pipe E.

What I claim, and desire to secure by Letters Patent, is—

1. A trap for ammonia refrigerating apparatus, consisting of a closed receptacle provided with a filling of metallic trimmings, or equivalent material, and an inlet and an outlet pipe, substantially as described.

2. A trap for ammonia refrigerating apparatus, consisting of a closed receptacle provided with a filling of metallic trimmings, or equivalent material, and an inlet and an outlet, the one communicating with the trap a short distance above the bottom and the other with the top thereof, substantially as described.

3. A trap for ammonia refrigerating apparatus, consisting of a closed receptacle provided with a foraminous plate a short distance above the bottom, a filling of metallic trimmings, or equivalent material, upon said plate, and an inlet and an outlet, the one communicating with the trap near the foraminous plate and the other near the top, substantially as described.

In testimony whereof I affix my signature in presence of two witnesses.

THEO. J. GOLDSCHMID.

Witnesses:
    FRED S. BELSTERLING,
    ALBERT E. KADUG.